(12) United States Patent
Yamasaki

(10) Patent No.: US 9,148,575 B2
(45) Date of Patent: Sep. 29, 2015

(54) ZOOM LENS AND IMAGE PICKUP APPARATUS INCLUDING THE SAME

(71) Applicant: CANON KABUSHIKI KAISHA, Tokyo (JP)

(72) Inventor: Shinji Yamasaki, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 29 days.

(21) Appl. No.: 14/217,686

(22) Filed: Mar. 18, 2014

(65) Prior Publication Data

US 2014/0300781 A1  Oct. 9, 2014

(30) Foreign Application Priority Data

Apr. 3, 2013 (JP) ................................ 2013-077500

(51) Int. Cl.
*H04N 5/232* (2006.01)
*G02B 15/14* (2006.01)
*G02B 13/00* (2006.01)
*G02B 15/177* (2006.01)

(52) U.S. Cl.
CPC .......... *H04N 5/23296* (2013.01); *G02B 13/009* (2013.01); *G02B 15/177* (2013.01); *H04N 5/23212* (2013.01)

(58) Field of Classification Search
CPC .... G02B 15/14; G02B 15/177; G02B 13/009; H04N 5/23296; H04N 5/23212
See application file for complete search history.

(56) References Cited

U.S. PATENT DOCUMENTS

| 7,212,351 | B2* | 5/2007 | Kawamura | 359/689 |
| 7,339,745 | B2* | 3/2008 | Hozumi et al. | 359/682 |
| 7,589,906 | B2* | 9/2009 | Ito | 359/682 |
| 7,643,222 | B2* | 1/2010 | Kanetaka | 359/682 |
| 8,031,410 | B2 | 10/2011 | Katakura | |
| 8,456,748 | B2* | 6/2013 | Saori | 359/680 |
| 8,582,211 | B2* | 11/2013 | Katakura | 359/682 |

FOREIGN PATENT DOCUMENTS

JP  2008-151974 A  7/2008

* cited by examiner

*Primary Examiner* — David N Spector
(74) *Attorney, Agent, or Firm* — Carter, DeLuca, Farrell & Schmidt, LLP

(57) ABSTRACT

A zoom lens includes first, second, and third lens units respectively having negative, positive, and negative refractive powers in this order from an object side to an image side. The lens units move during zooming such that the spacing between adjacent lens units changes, the second and third lens units are positioned on the object side at a telephoto end when compared to a wide angle end, and the third lens unit moves during focusing. A lateral magnification of the second lens unit at the wide angle end, a lateral magnification of the second lens unit at the telephoto end, a lateral magnification of the third lens unit at the wide angle end, a lateral magnification of the third lens unit at the telephoto end, a focal length of the first lens unit, and a focal length of the second lens unit are appropriately set.

12 Claims, 9 Drawing Sheets

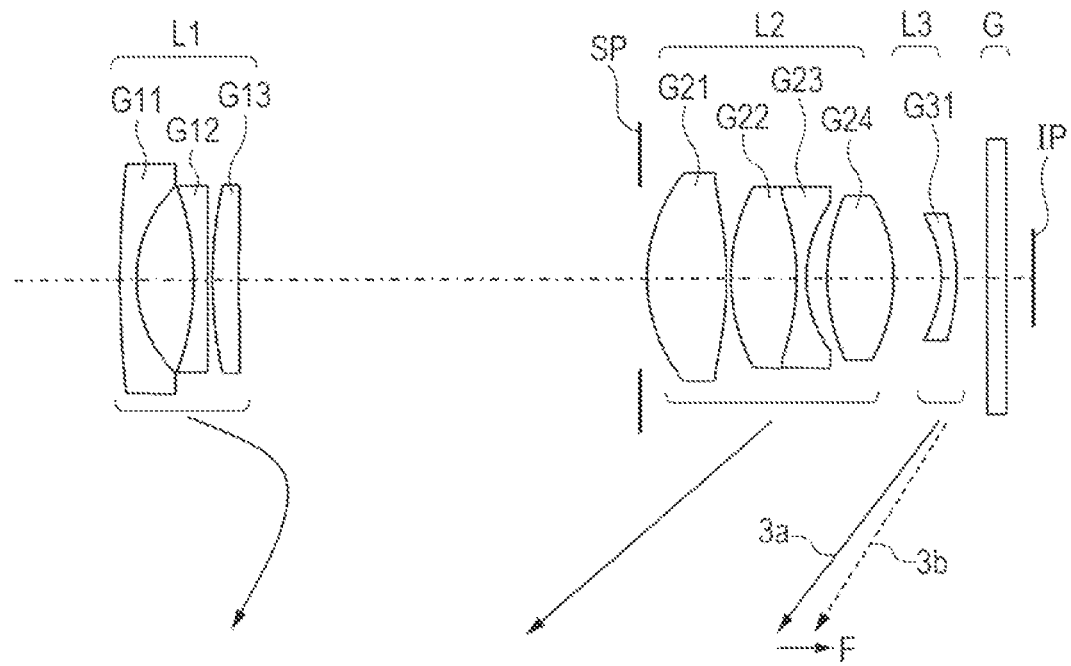
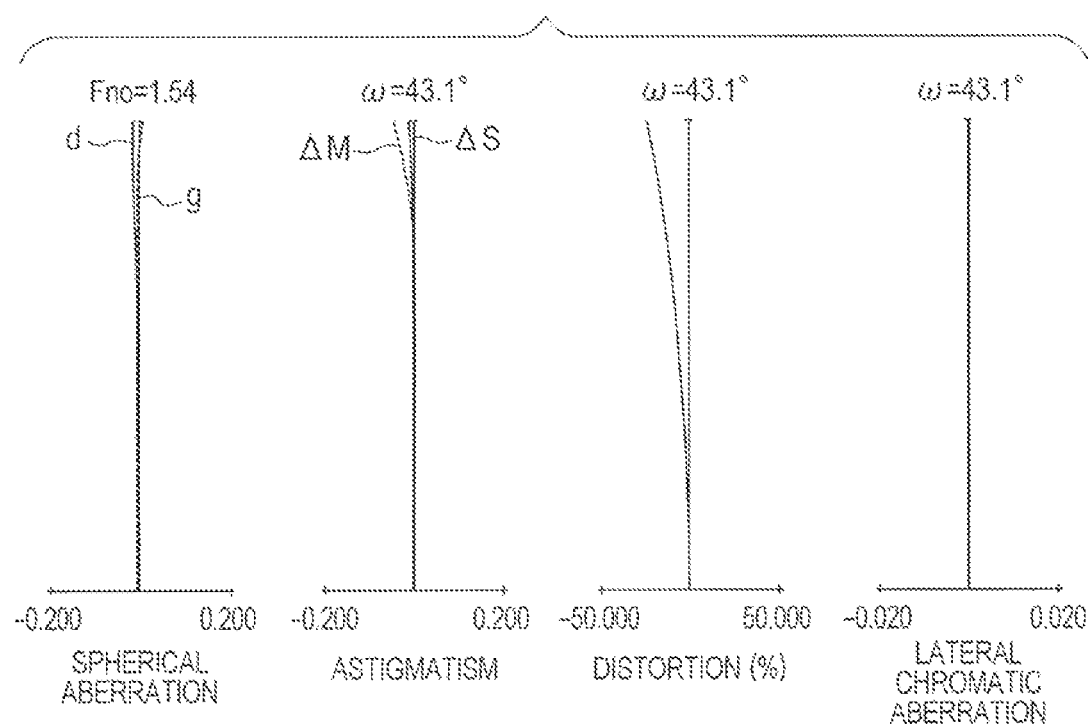

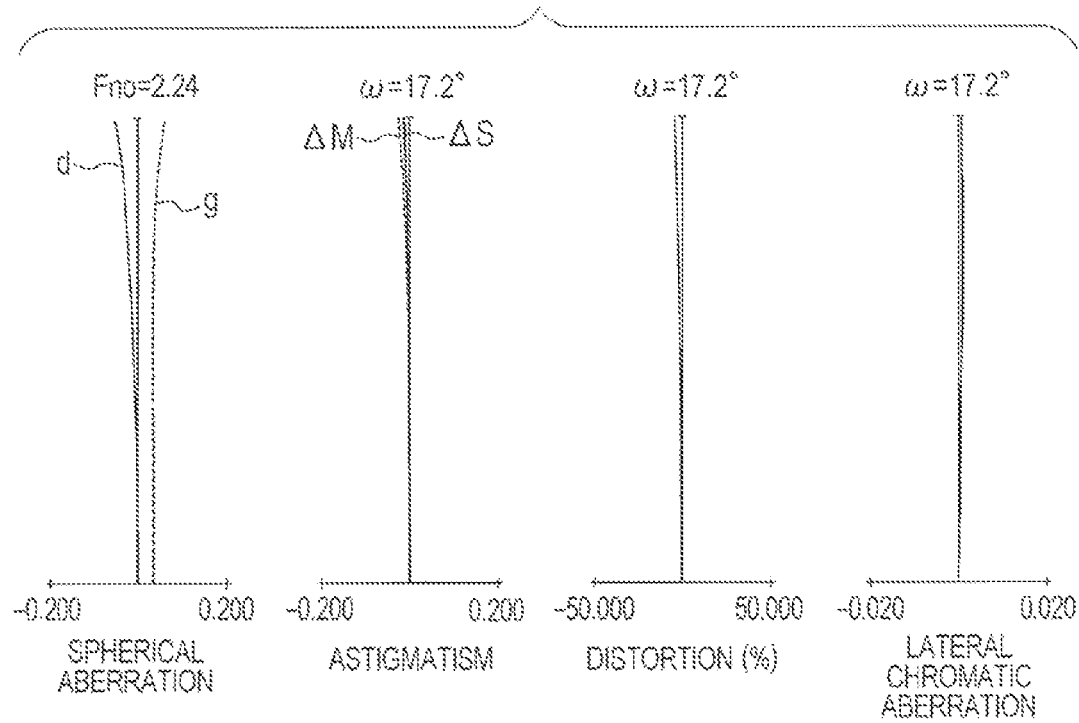
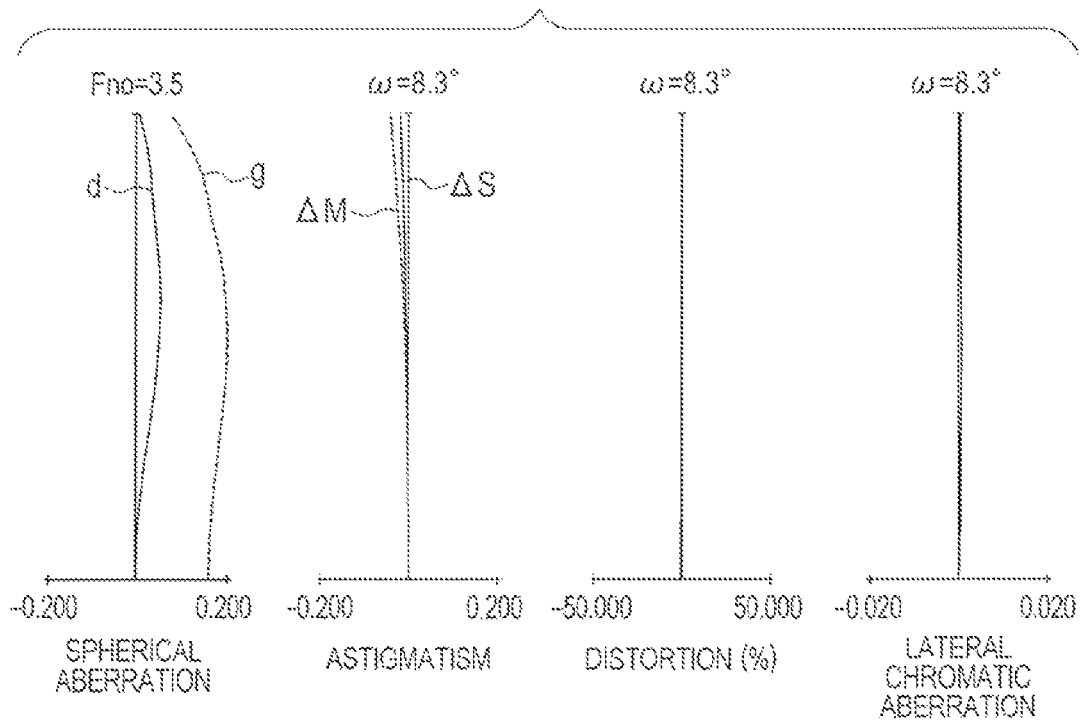

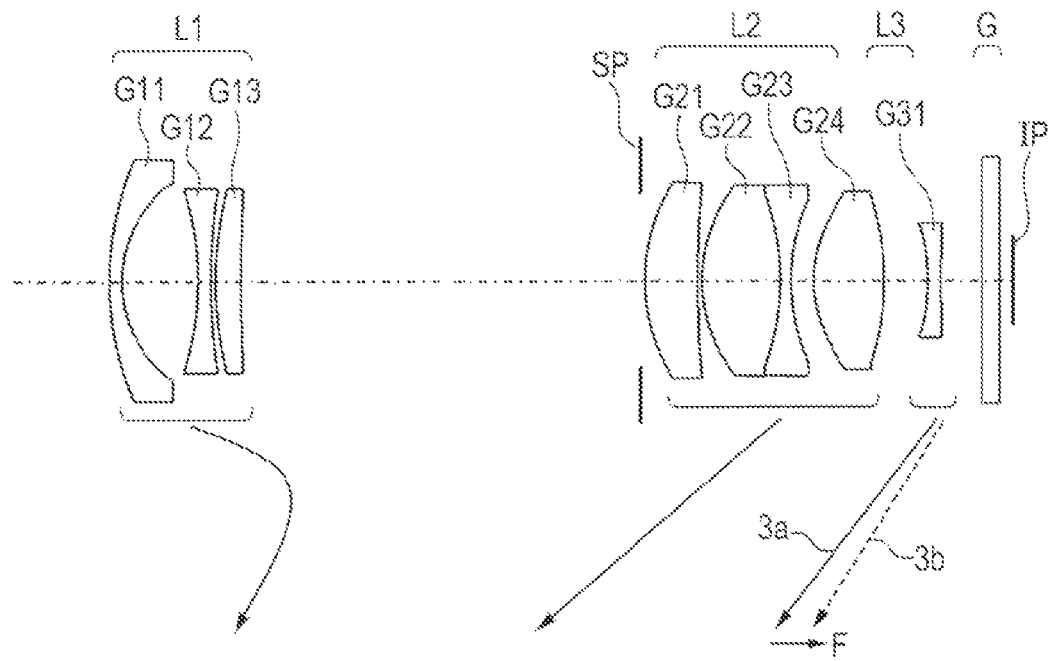
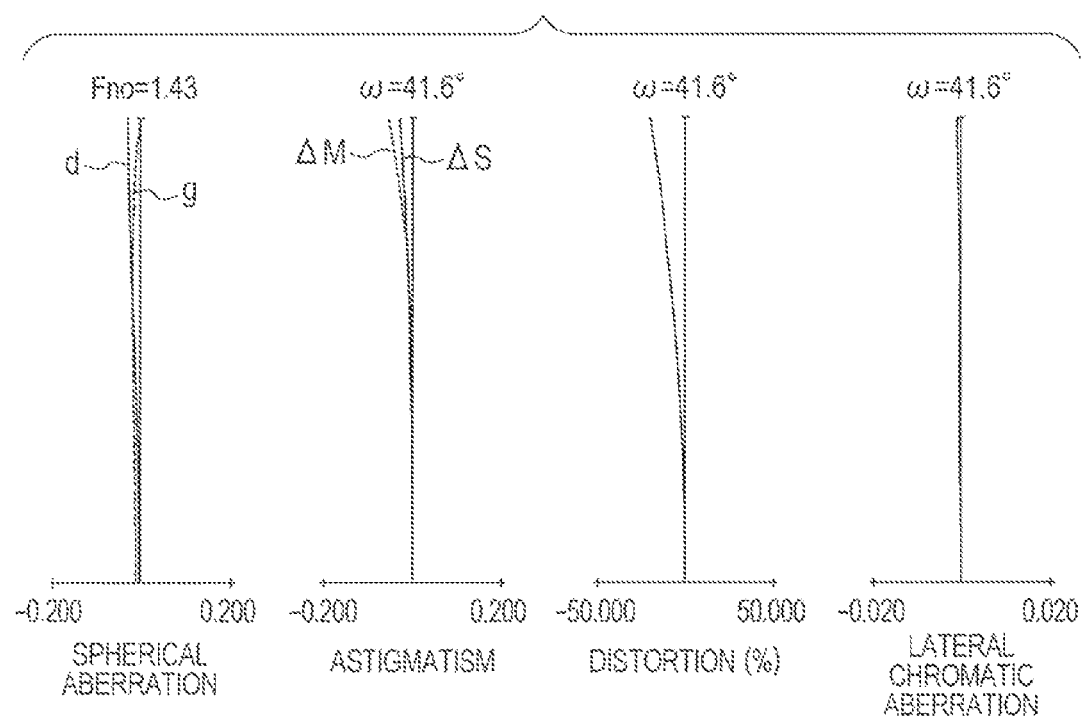

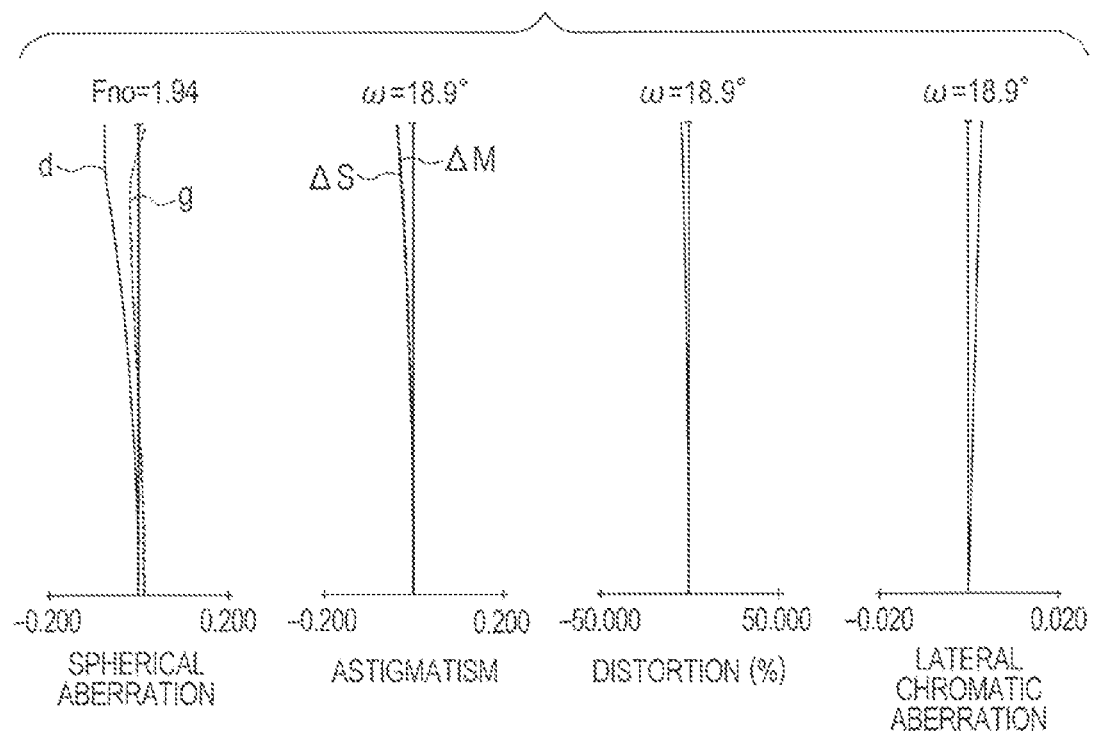
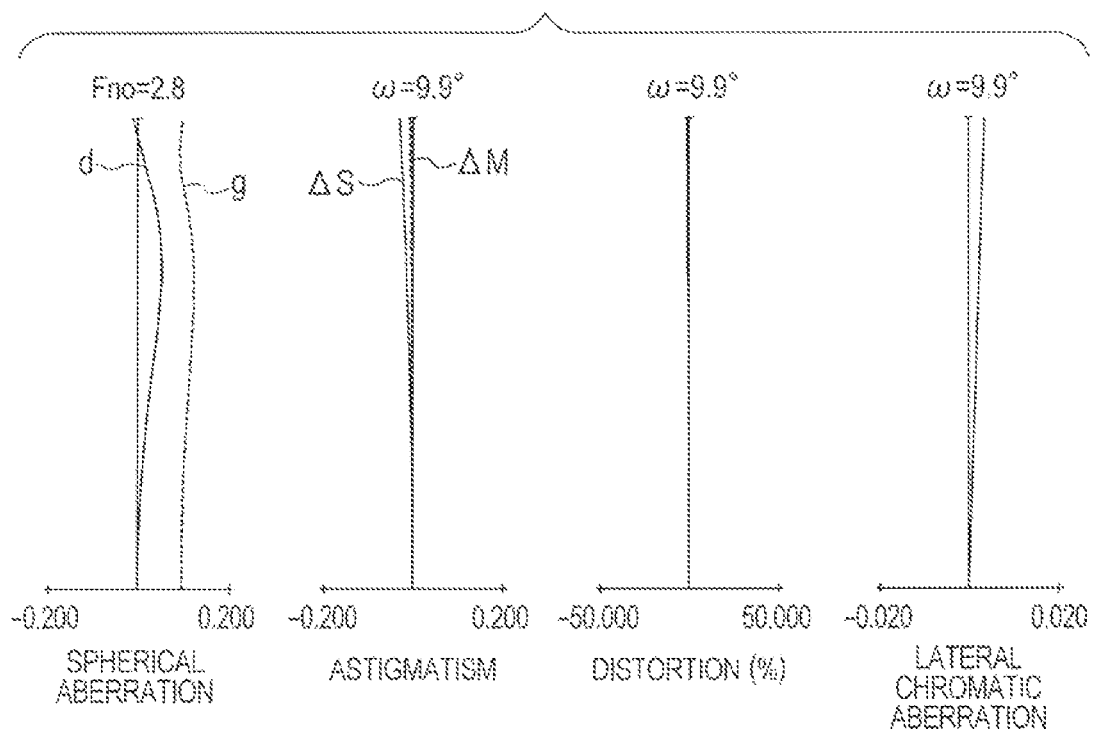

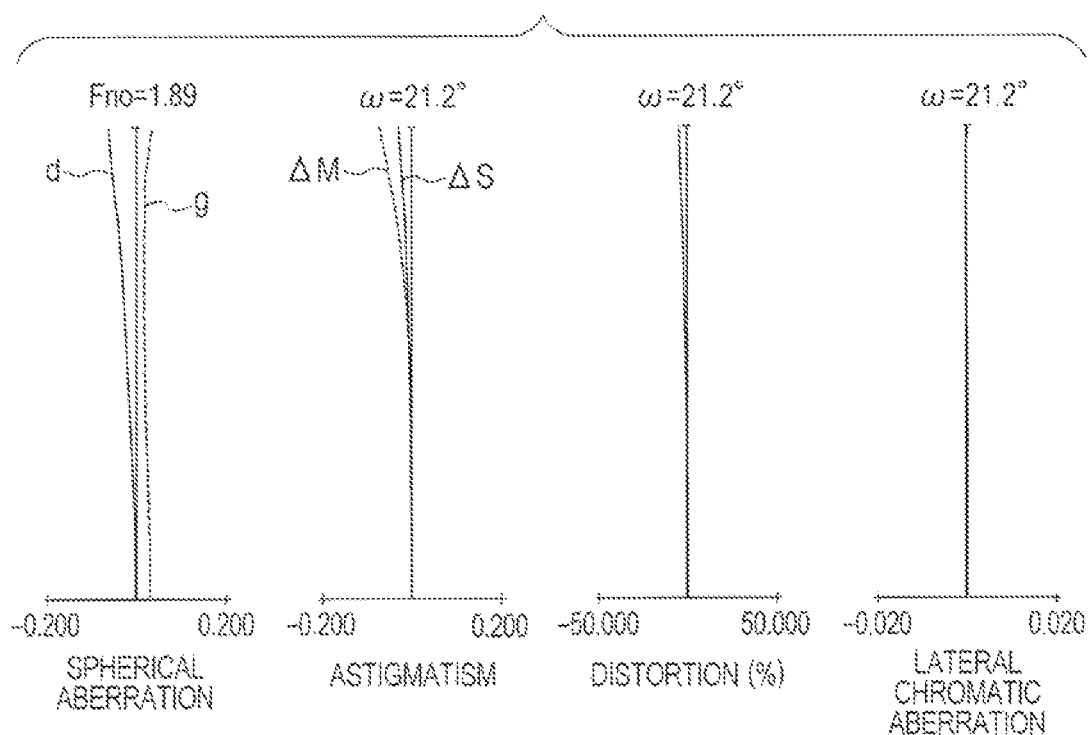
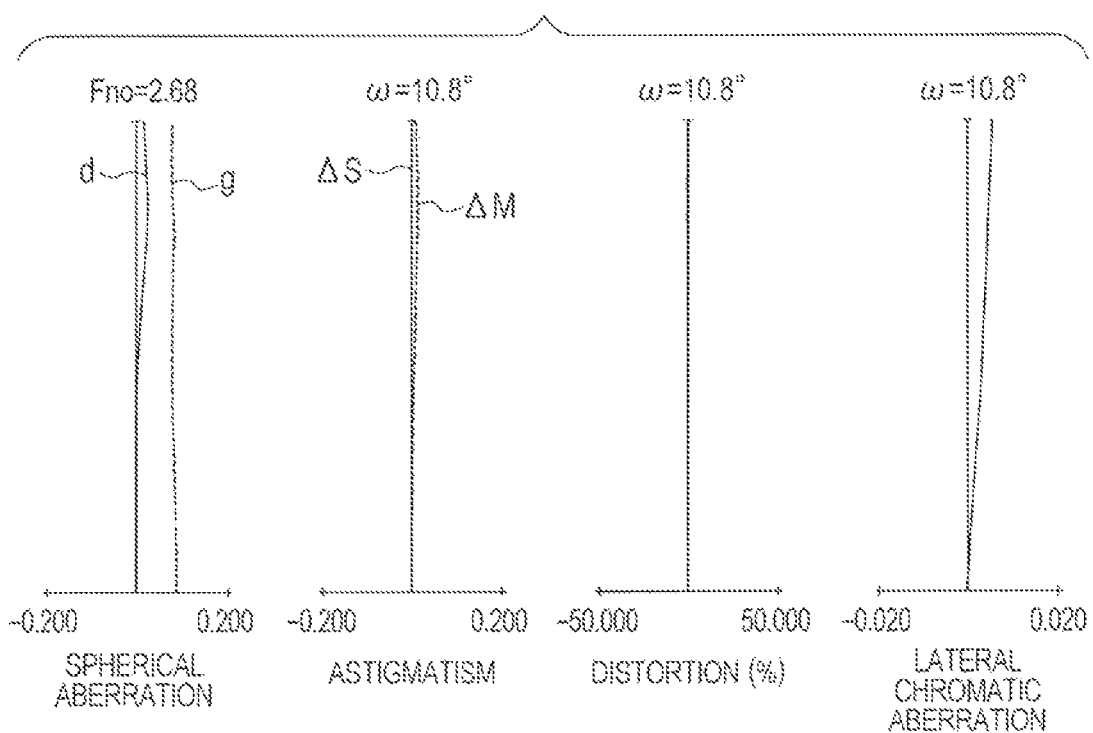

ZOOM LENS AND IMAGE PICKUP APPARATUS INCLUDING THE SAME

BACKGROUND OF THE INVENTION

1. Field of the Invention

The present invention relates to a zoom lens and, more particularly, to a zoom lens suitable as an imaging lens for use in an image pickup apparatus such as a monitoring camera, digital camera, video camera, or broadcasting camera.

2. Description of the Related Art

An image pickup apparatus using a solid-state image sensor is required to include an imaging lens having a high optical performance capable of corresponding to a high resolution of the solid-state image sensor.

Also, an imaging lens for a monitoring camera is required to be able to pick up an image with a wide range by a single monitoring camera, be a zoom lens having a high zoom ratio, be readily installable, be small so as to be inconspicuous, and have a small f-number so as to be able to perform picking up an image even in a dark environment.

As an arrangement that readily implements a wide-angle, small-sized zoom lens, a zoom lens in which a first lens unit having a negative refractive power, a second lens unit having a positive refractive power, and a third lens unit having a negative refractive power are arranged in this order from an object side to an image side is known. For example, Japanese Patent Application Laid-Open No. 2008-151947 and U.S. Pat. No. 8,031,410 have disclosed zoom lenses in each of which a first lens unit having a negative refractive power, a second lens unit having a positive refractive power, and a third lens unit having a negative refractive power are arranged in this order from an object side to an image side.

However, to implement a zoom lens that simultaneously satisfies a wide angle of field, small size, large aperture, and high zoom ratio by using the above-mentioned, three-unit zoom lenses, it is necessary to appropriately set, e.g., the refractive power of each lens unit forming the zoom lens, the lens configuration of each lens unit, and the moving amount of each lens unit during zooming.

SUMMARY OF THE INVENTION

A zoom lens of the present invention includes a first lens unit having a negative refractive power, a second lens unit having a positive refractive power, and a third lens unit having a negative refractive power in an order named from an object side to an image side, the lens units moving during zooming such that a spacing between adjacent lens units changes, the second lens unit and the third lens unit being positioned on the object side at a telephoto end in comparison to at a wide angle end, and the third lens unit moving during focusing, wherein conditional expressions below are met:

$$2.5 < \beta 2t/\beta 2w < 4.5$$

$$0.35 < (\beta 3t/(\beta 3w))/(\beta 2t/\beta 2w) < 0.80$$

$$-1.0 < f1/f2 < -0.5$$

where $\beta 2w$ represents a lateral magnification of the second lens unit at the wide angle end, $\beta 2t$ be a lateral magnification of the second lens unit at the telephoto end, $\beta 3w$ be a lateral magnification of the third lens unit at the wide angle end, $\beta 3t$ be a lateral magnification of the third lens unit at the telephoto end, f1 be a focal length of the first lens unit, and f2 be a focal length of the second lens unit.

Further features of the present invention will become apparent from the following description of exemplary embodiments with reference to the attached drawings.

BRIEF DESCRIPTION OF THE DRAWINGS

FIG. 1 is a view showing lens sections and moving loci at a wide angle end of the first embodiment.

FIG. 2A is a view showing various aberrations at the wide angle end of the first embodiment.

FIG. 2B is a view showing the various aberrations at an intermediate zoom position of the first embodiment.

FIG. 2C is a view showing the various aberrations at a telephoto end of the first embodiment.

FIG. 3 is a view showing lens sections and moving loci at a wide angle end of the second embodiment.

FIG. 4A is a view showing various aberrations at the wide angle end of the second embodiment.

FIG. 6B is a view showing the various aberrations at an intermediate zoom position of the third embodiment.

FIG. 6C is a view showing the various aberrations at a telephoto end of the first embodiment.

FIG. 8B is a view showing the various aberrations at an intermediate zoom position of the fourth embodiment.

FIG. 8C is a view showing the various aberrations at a telephoto end of the fourth embodiment.

DESCRIPTION OF THE EMBODIMENTS

A zoom lens of the present invention and an image pickup apparatus including the zoom lens will be explained below with reference to the accompanying drawings. The zoom lens of the present invention includes a first lens unit having a negative refractive power, a second lens unit having a positive refractive power, and a third lens unit having a negative refractive power in this order from an object side to an image side. When performing zooming, the lens units move so as to change the spacing between adjacent lens units. Also, the second and third lens units are positioned on the object side at a telephoto end in comparison to at a wide angle end. In addition, the third lens unit moves during focusing.

FIG. 1 is a view showing lens sections at the wide angle end (short focal length end) of a zoom lens of the first embodiment of the present invention. FIGS. 2A, 2B, and 2C are views showing aberrations at the wide angle end, an intermediate zoom position, and a telephoto end (long focal length end), respectively, of the zoom lens of the first embodiment of the present invention. The first embodiment is a zoom lens having a zoom ratio of 4.9 and an aperture ratio of 1.54 to 3.50.

Figure 4B:
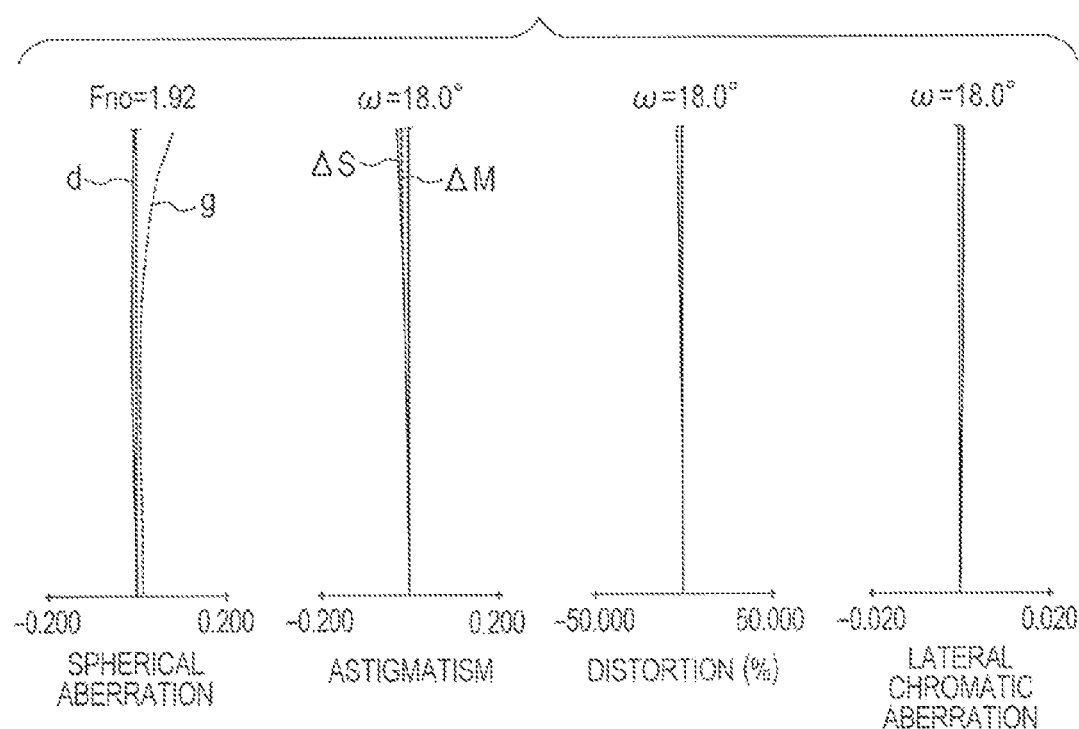
FIG. 4B is a view showing the various aberrations at an intermediate zoom position of the second embodiment.
Figure 4C:
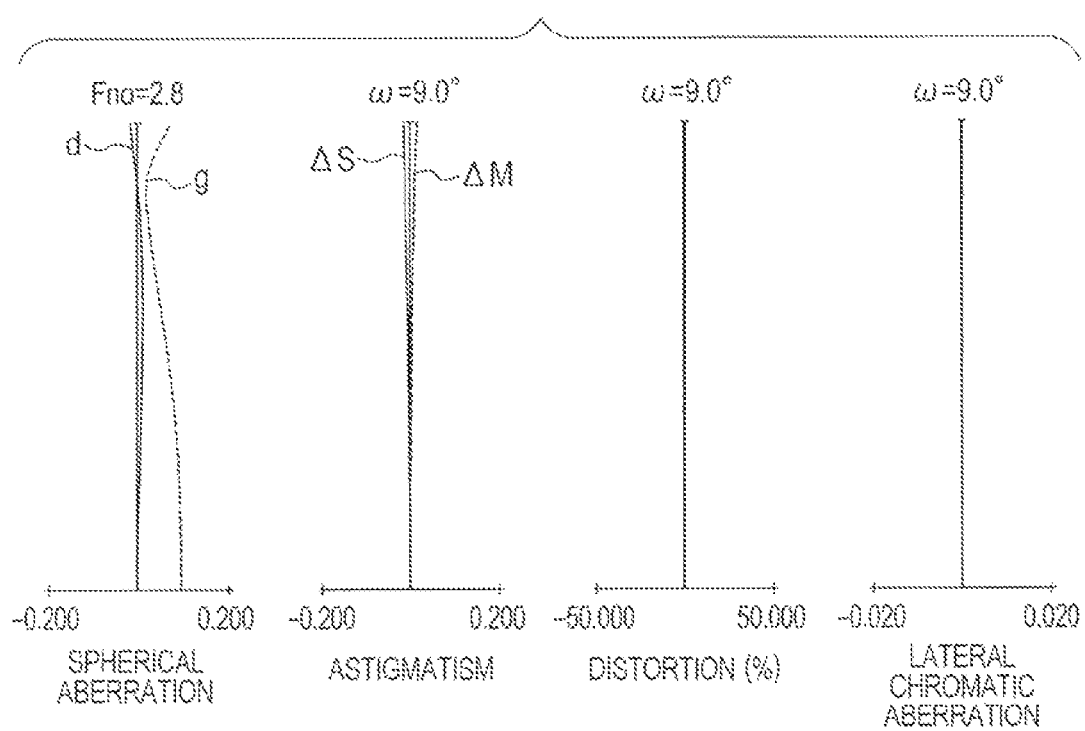
FIG. 4C is a view showing the various aberrations at a telephoto end of the second embodiment.

FIG. 3 is a view showing lens sections at a wide angle end of a zoom lens of the second embodiment of the present invention. FIGS. 4A, 4B, and 4C are views showing aberrations at the wide angle end, an intermediate zoom position, and a telephoto end, respectively, of the zoom lens of the second embodiment of the present invention. The second embodiment is a zoom lens having a zoom ratio of 4.5 and an aperture ratio of 1.43 to 2.80.

Figure 5:
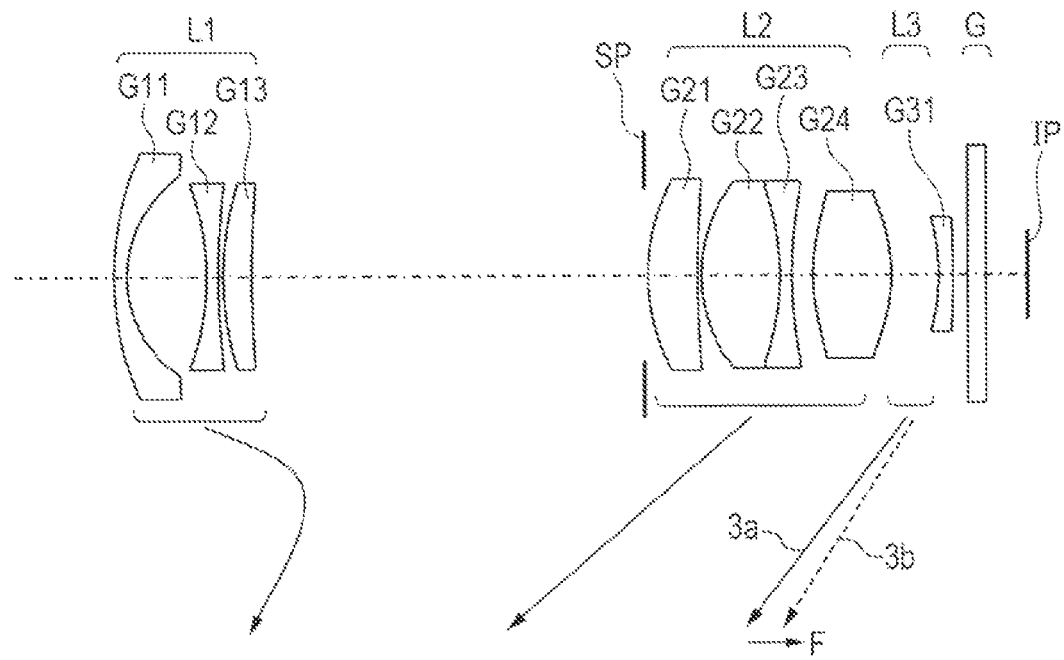
FIG. 5 is a view showing lens sections and moving loci at a wide angle end of the third embodiment.
Figure 6A:
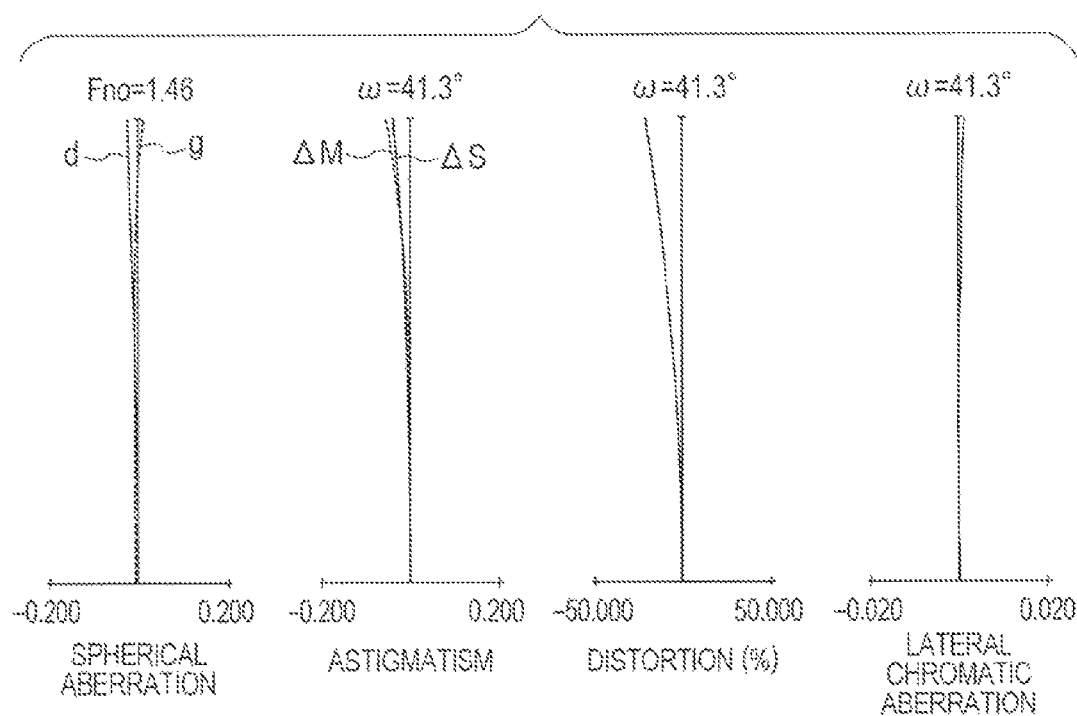
FIG. 6A is a view showing various aberrations at the wide angle end of the third embodiment.

FIG. 5 is a view showing lens sections at a wide angle end of a zoom lens of the third embodiment of the present invention. FIGS. 6A, 6B, and 6C are views showing aberrations at the wide angle end, an intermediate zoom position, and a telephoto end, respectively, of the zoom lens of the third embodiment of the present invention. The third embodiment is a zoom lens having a zoom ratio of 4.0 and an aperture ratio of 1.46 to 2.80.

Figure 7:
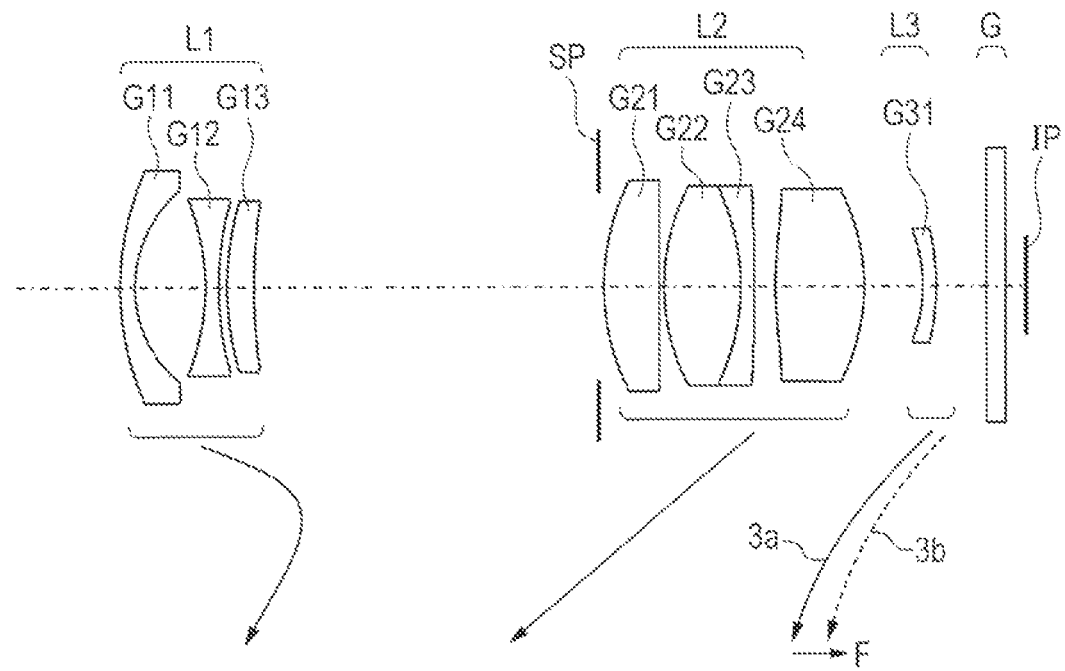
FIG. 7 is a view showing lens sections and moving loci at a wide angle end of the fourth embodiment.
Figure 8A:
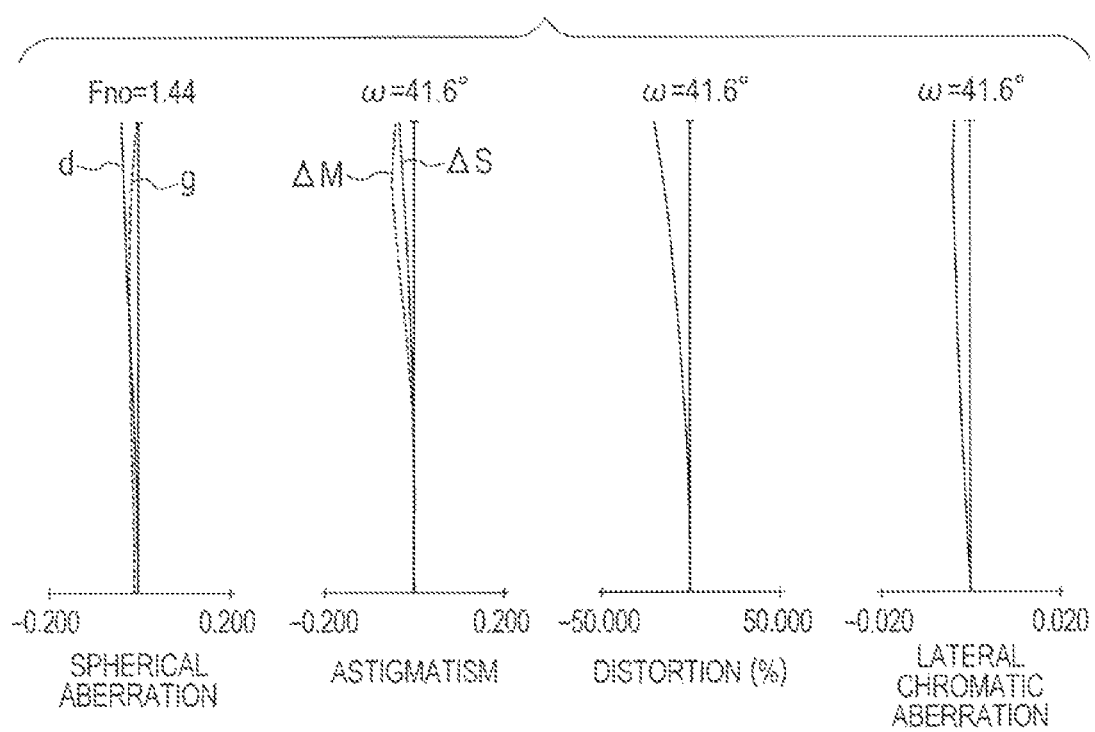
FIG. 8A is a view showing various aberrations at the wide angle end of the fourth embodiment.

FIG. 7 is a view showing lens sections at a wide angle end of a zoom lens of the fourth embodiment of the present invention. FIGS. 8A, 8B, and 8C are views showing aberrations at the wide angle end, an intermediate zoom position, and a telephoto end, respectively, of the zoom lens of the fourth embodiment of the present invention. The fourth embodiment is a zoom lens having a zoom ratio of 3.7 and an aperture ratio of 1.44 to 2.68.

Figure 9:
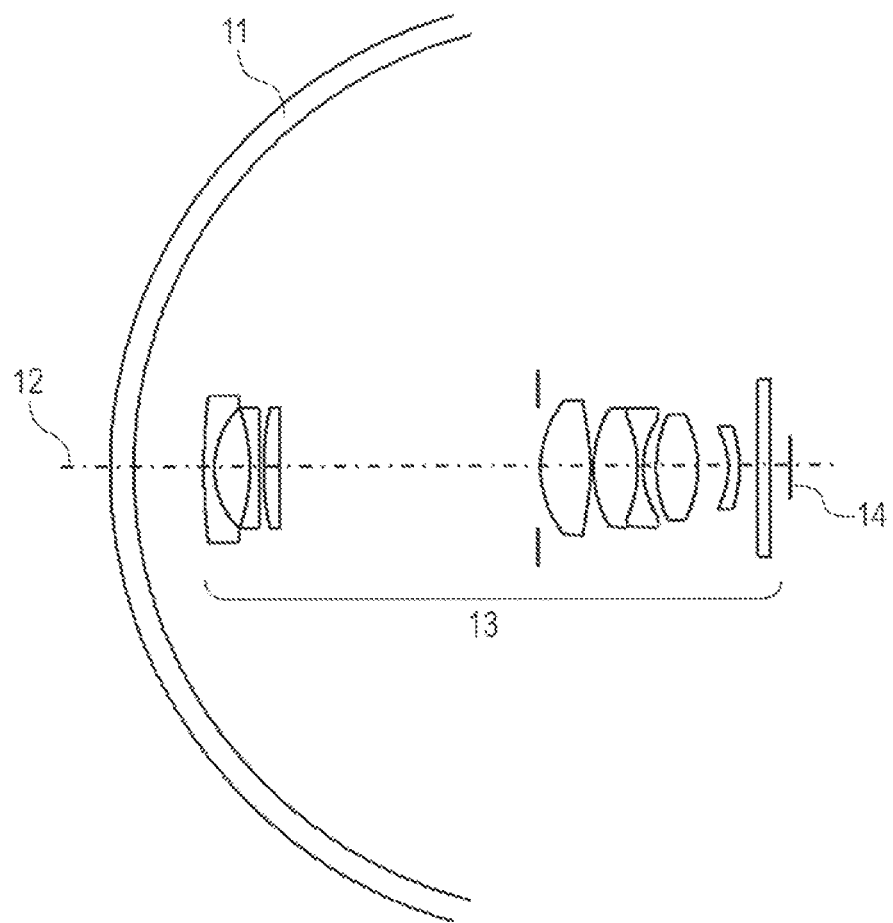
FIG. 9 is a view showing lens sections when the zoom lens of the present invention is applied to a dome cover.
Figure 10:
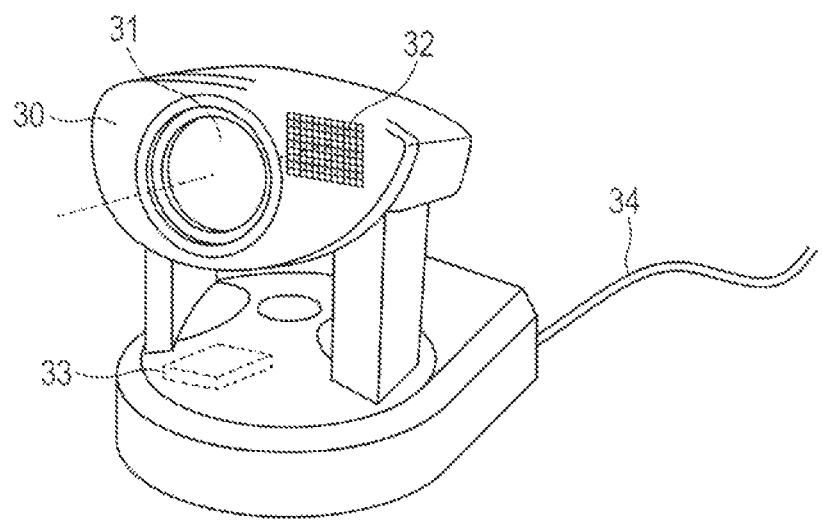
FIG. 10 is a schematic view showing main parts when the zoom lens of the present invention is applied to a monitoring camera.

FIG. 9 is a view showing lens sections when the zoom lens of the present invention is applied to a monitoring camera with a dome cover. FIG. 10 is a schematic view showing main components of a monitoring camera (image pickup apparatus) including the zoom lens of the present invention.

The zoom lens of each embodiment is an imaging lens system for use in an image pickup apparatus. In each lens sectional view, the left side is the object side (front side), and the right side is the image side (back side). Note that the zoom lens of each embodiment is also applicable to an optical apparatus such as a projector. In this case, the left side is a screen, and the right side is an image to be projected. In each lens sectional view, L1 is the first lens unit having a negative refractive power (optical power=reciprocal of focal length), L2 is the second lens unit having a positive refractive power, and L3 is the third lens unit having a negative refractive power. SP is an f-number determining member (to be also referred to as an "aperture stop" hereinafter) that functions as an aperture stop for determining (restricting) a maximum f-number (Fno) beam.

G is an optical block equivalent to, e.g., an optical filter, face plate, quartz low pass filter, or infrared cut filter. IP is an image plane. When using the zoom lens as an image pickup optical system of a video camera or digital still camera, an imaging plane of a solid-state image sensor (photoelectric transducer) such as a CCD sensor or CMOS sensor is placed on the image plane IP.

The arrows indicate the moving loci of the lens units when performing zooming from the wide angle end to the telephoto end. An arrow 3a for the third lens unit L3 indicates a moving locus when performing zooming from the wide angle end to the telephoto end while focusing is performed to infinity. Also, an arrow 3b indicates a moving locus when performing zooming from the wide angle end to the telephoto end while focusing is performed to a short distance. An arrow F for the third lens unit L3 indicates a moving direction when performing focusing from infinity to a short distance.

In a spherical aberration view of the aberration views, a solid line d indicates a d-line, and a dotted line g indicates a g-line. Fno is an f-number. In an astigmatism view, a dotted line ΔM is a meridional image plane, and a solid line ΔS is a sagittal image plane. Note that lateral chromatic aberration is represented by the g-line. w is a half angle of field. Note that in each of the following embodiments, the wide angle end and telephoto end are zoom positions when a variable magnification lens unit is mechanically positioned at the two ends of a movable range on the optical axis.

Each embodiment is a three-unit zoom lens including the first lens unit L1 having a negative refractive power, the second lens unit L2 having a positive refractive power, and the third lens unit L3 having a negative refractive power in this order from the object side to the image side. When performing zooming from the wide angle end to the telephoto end, these lens units move as indicated by the arrows. More specifically, when performing zooming from the wide angle end to the telephoto end, the first lens unit L1 moves along a locus convex to the image side, the second lens unit monotonically moves to the object side, and the third lens unit moves to the object side.

A zoom type of the zoom lens of each embodiment is a negative lead type using a few lens units and advantageous in downsizing, and the zoom lens has a lens configuration suitable for performing zooming by changing the spacing between adjacent lens units. When performing zooming from the wide angle end to the telephoto end, the magnification is changed by moving the second lens unit L2 and third lens unit L3 (both are variators or variable magnification lens units). The first lens unit (a compensator or correction lens unit) corrects an image plane variation caused by the magnification change.

Furthermore, for the movement of each lens unit, the third lens unit L3 is also positively given the variable magnification effect, in addition to the variable magnification (the lateral magnification ratio of the wide angle end to the telephoto end) action of the second lens unit L2. Consequently, while the increase in moving amount of each lens unit during zooming is reduced, downsizing of the whole system is maintained and the zoom ratio is increased at the same time.

When performing focusing, the third lens unit L3 moves. This is so because when focusing is performed using the third lens unit L3 whose lens diameter is readily decreased, the size of a lens barrel for focus driving is decreased, and this is suited to downsizing of the image pickup apparatus. The zoom lens of the present invention satisfies the following conditional expressions:

$$2.5 < \beta 2t/\beta 2w < 4.5 \quad (1)$$

$$0.35 < (\beta 3t/\beta 3w)/(\beta 2t/\beta 2w) < 0.80 \quad (2)$$

$$-1.0 < f1/f2 < -0.5 \quad (3)$$

where $\beta 2w$ and $\beta 2t$ represent the lateral magnifications of the second lens unit L2 at the wide angle end and telephoto end, respectively, $\beta 3w$ and $\beta 3t$ represent the lateral magnifications of the third lens unit L3 at the wide angle end and telephoto end, respectively, f1 and f2 represent the focal lengths of the first lens unit L1 and second lens unit L2, respectively.

Conditional expression (1) properly sets the lateral magnification ratio of the first lens unit L1 at the wide angle end and telephoto end. That is, conditional expression (1) properly sets a favorable lateral magnification ratio at the wide angle end and telephoto end of the second lens unit L2 and third lens unit L3, i.e., the condition of variable magnification sharing. To increase the zoom ratio of the zoom lens of each embodiment, variable magnification sharing is divided to the second lens unit L2 and third lens unit L3, thereby reducing the moving amount (reducing the total lens length) during zooming, and downsizing the whole system. For this purpose, the variable magnification ratio of the third lens unit L3 is effectively obtained while a predetermined variable magnification ratio is ensured by the movement of the second lens unit L2 during zooming.

If the variable magnification share of the second lens unit L2 increases beyond the upper limit of conditional expression (1), the moving amount of the second lens unit L2 increases during zooming, and this makes it difficult to downsize the whole system because the total lens length increases. If the variable magnification share of the second lens unit L2 decreases beyond the lower limit of conditional expression (1), it is necessary to obtain the variable magnification effect by the third lens unit L3 instead. Consequently, the moving amount of the third lens unit L3 increases during zooming, and this makes the whole system difficult to downsize.

If the variable magnification share of the third lens unit L3 increases beyond the upper limit of conditional expression (2), the moving amount of the third lens unit L3 increase during zooming. Also, many various aberrations occur, and the number of lenses must be increased in order to correct these aberrations. This makes downsizing of the whole system difficult. If the variable magnification share of the second lens unit L2 increases beyond the lower limit of conditional expression (2), the moving amount of the second lens unit L2 increases during zooming, the total lens length increases, and the whole system becomes difficult to downsize.

Conditional expression (3) sets the relationship between the focal length of the second lens unit L2 as one variable magnification lens unit, and the focal length of the first lens unit L1 requiring a negative refractive power in order to obtain a wide angle of field. The first lens unit L1 must have a relatively high negative refractive power so that as the whole zoom lens is of a negative lead type in order to obtain a wide angle of field.

At the same time, a negative refractive power having an appropriate value is required as a correction lens unit for correcting the image plane variation caused by the magnification change. In addition, the second lens unit L2 must have a predetermined positive refractive power so as to be given the variable magnification effect. This makes it necessary to properly set a refractive power balance with the first lens unit L1. Conditional expression (3) is set for this purpose.

If the focal length of the first lens unit L1 decreases (the negative refractive power increases) beyond the upper limit of conditional expression (3), field curvature and chromatic aberration increase accordingly. In addition, when the value goes above the upper limit of conditional expression (3), the focal length of the second lens unit L2 may tend to increase. Accordingly, the positive refractive power of the second lens unit L2 becomes too low. Since this increases the moving amount of the second lens unit L2 during zooming, the total lens length or front lens effective diameter increases.

If the focal length of the first lens unit L1 increases (the negative refractive power decreases) beyond the lower limit of conditional expression (3), the moving amount of the first lens unit L1 increases during zooming from the wide angle end to the telephoto end, in order to correct the image plane variation caused by the magnification change. As a consequence, the total lens length or front lens effective diameter increases. In addition, when the value goes below the lower limit of conditional expression (3), the focal length of the second lens unit L2 may tend to decrease. Accordingly, the positive refractive power of the second lens unit L2 becomes too high, and various aberrations such as spherical aberration increase. Preferably, the numerical value ranges of conditional expressions (1) to (3) are limited as follows:

$$2.6 < \beta 2t/\beta 2w < 4.0 \tag{1a}$$

$$0.38 < (\beta 3t/\beta 3w)/(\beta 2t/\beta 2w) < 0.65 \tag{2a}$$

$$-0.98 < f1/f2 < -0.70 \tag{3a}$$

In each embodiment, it is more favorable to satisfy at least one of conditional expressions below.

Let f3 be the focal length of the third lens unit L3. The first lens unit L1 includes at least two negative lenses and at least one positive lens. Let vd1n be the average Abbe constant of the materials of the negative lenses included in the first lens unit L2, and vd1p be the average Abbe constant of the materials of the positive lenses included in the first lens unit L1. When there is only one positive lens, the Abbe constant vd1p is the Abbe constant of the material of this positive lens. Note that an Abbe constant vd of a material is defined as follows, $$vd=(nd-1)/(nF-nC)$$

where nd represents a refractive index for the d-line (587.6 nm), nF represents a refractive index for the F-line (486.1 nm), and nC represents a refractive index for the C-line (656.3 nm).

It is favorable to satisfy one or more of the following conditional expressions:

$$-0.65 < f2/f3 < -0.25 \tag{4}$$

$$2.3 < vd1n/vd1p < 3.5 \tag{5}$$

$$-3.3 < f1/fw < -1.9 \tag{6}$$

$$0.52 < f2/ft < 0.80 \tag{7}$$

$$2.1 < vd2p/vd2n < 3.0 \tag{8}$$

$$-4.5 < f3/(fw \cdot ft)^{(1/2)} < -2.5 \tag{9}$$

$$-3.3 < f3/M3 < -1.5 \tag{10}$$

$$1.15 < \beta 3t/\beta 3w < 1.60 \tag{11}$$

where fw represents the focal length of the whole system at the wide angle end, ft represents the focal length of the whole system at the telephoto end, the second lens unit L2 includes a cemented lens obtained by cementing a positive lens and negative lens, vd2p represents the Abbe constant of the material of the positive lens of the cemented lens, and vd2n represents the Abbe constant of the material of the negative lens of the cemented lens, the third lens unit L3 includes one negative lens, f3 represents the focal length of the third lens unit L3, M3 represents the moving amount of the third lens unit L3 during zooming from the wide angle end to the telephoto end, the moving amount M3 is the difference between the position of the third lens unit L3 on the optical axis at the wide angle end and the position of the third lens unit L3 on the optical axis at the telephoto end, and the sign of the moving amount M3 is plus.

The technical meanings of the above-described conditional expressions will be explained below.

Conditional expression (4) properly sets the refractive powers of the second lens unit L2 and third lens unit L3. In each embodiment, both the second lens unit L2 and third lens unit L3 are lens units serving as lens unit for enhancing the magnification. Therefore, downsizing of the whole system is maintained and the zoom ratio is increased at the same time by appropriately setting the conditions of the refractive powers of the two lens units.

If the refractive power of the second lens unit L2 increases beyond the upper limit of conditional expression (4), various aberrations such as spherical aberration and coma increase. If the negative refractive power of the third lens unit L3 increases beyond the lower limit of the conditional expression (4), various aberrations such as coma increase. In addition, an aberration variation caused by an object distance change increases when performing focusing by the third lens unit L3.

Conditional expression (5) is a condition for favorably correcting lateral chromatic aberration caused by the first lens unit L1.

In each embodiment, a material having a high refractive index is selected as the material of a lens having a negative refractive power (to be referred to as a "negative lens" hereinafter) on the object side, in order to increase the angle of field and downsize the whole system. In this case, many chromatic aberrations occur because the Abbe constant becomes too small. In each embodiment, this is corrected by using a material having a small Abbe constant as the material of the positive lens of the first lens unit L1.

If the value goes above the upper limit of conditional expression (5), the average Abbe constant of the materials of the positive lenses tends to become too small, so the correction of chromatic aberrations becomes excessive. If the value goes below the lower limit of conditional expression (5), the average Abbe constant of the materials of the positive lenses tends to become too large, so the correction of chromatic aberrations becomes insufficient.

Conditional expression (6) is a condition for obtaining a good optical performance while increasing the angle of field and downsizing the whole system by appropriately setting the negative refractive power of the first lens unit L1. If the negative refractive power of the first lens unit L1 increases beyond the upper limit of conditional expression (6), field curvature and chromatic aberration increase in the entire zoom range, and it becomes difficult to correct these various aberrations. If the negative refractive power of the first lens unit L1 decreases beyond the lower limit of conditional expression (6), it becomes difficult to obtain a wide angle of field. In addition, the whole system becomes difficult to downsize because the effective diameter of the first lens unit L1 increases.

Conditional expression (7) is a condition for obtaining a good optical performance while increasing the zoom ratio and downsizing the whole system, by adequately setting the relationship between the refractive power of the second lens unit L2 for zooming, and the focal length of the whole system at the telephoto end. If the refractive power of the second lens unit L2 for zooming decreases beyond the upper limit of conditional expression (7), the moving amount of the second lens unit L2 increases during zooming, and this makes it difficult to downsize the whole system. If the refractive power of the second lens unit L2 increases beyond the lower limit of conditional expression (7), field curvature and chromatic aberration increase in the entire zoom range, and this makes it difficult to correct these various aberrations.

Conditional expression (8) is related to the materials of the positive lens and negative lens of the cemented lens forming the second lens unit L2, and is mainly a condition for suppressing a variation in chromatic aberration in the entire zoom range. If the difference between the Abbe constant of the materials of the positive and negative lenses of the cemented lens increases beyond the upper limit of conditional expression (8), chromatic aberration is excessively corrected. If the difference between the Abbe constant of the materials of the positive and negative lenses of the cemented lens decreases beyond the lower limit of conditional expression (8), chromatic aberration is insufficiently corrected, and axial chromatic aberration particularly increases at the telephoto end.

Conditional expression (9) is related to the refractive power of the third lens unit L3, and is mainly a condition for properly performing focusing while obtaining a predetermined variable magnification effect or more. If the negative refractive power of the third lens unit L3 increases beyond the upper limit of conditional expression (9), offaxial aberrations such as astigmatism and field curvature increase. Furthermore, the sensitivity of the third lens unit L3 during focusing becomes too high. This makes it difficult to perform focusing control to a best in-focus position, and often decreases the resolving power.

If the negative refractive power of the third lens unit L3 decreases beyond the lower limit of conditional expression (9), the moving amount of the third lens unit L3 increases during focusing and zooming, and this makes downsizing difficult.

Conditional expression (10) is related to the negative refractive power and the moving amount during zooming of the third lens unit L3, and conditional expression (11) is related to the variable magnification share of the third lens unit L3. In this case, the third lens unit L3 is formed by one negative lens, and an appropriate configuration of the third lens unit L3 is specified by taking account of the function of the third lens unit L3 as a focusing lens unit. If the negative refractive power of the third lens unit L3 increases beyond the upper limit of conditional expression (10), the variable magnification share increases too much, and variations in various aberrations such as astigmatism increase during zooming.

If the negative refractive power of the third lens unit L3 decreases beyond the lower limit of conditional expression (10), it becomes difficult to obtain a sufficient variable magnification effect and a high zoom ratio.

If the third lens unit L3 is given the variable magnification effect beyond the upper limit of conditional expression (11), variations in various aberrations increase during zooming. Therefore, the third lens unit L3 must include a plurality of lenses, and this makes downsizing of the whole system difficult. If the value goes below the lower limit of conditional expression (11), the variable magnification effect of the third lens unit L3 decreases. Accordingly, the variable magnification load on the second lens unit L2 must be increased. This increases the moving amount of the second lens unit L2 during zooming, and makes downsizing of the whole system difficult. More preferably, the numerical value ranges of conditional expressions (4) to (11) are set as follows:

$$-0.60 < f2/f3 < -0.29 \tag{4a}$$

$$2.4 < vd1n/vd1p < 3.2 \tag{5a}$$

$$-3.0 < f1/fw < -2.0 \tag{6a}$$

$$0.53 < f2/ft < 0.77 \tag{7a}$$

$$2.2 < vd2p/vd2n < 2.9 \tag{8a}$$

$$-4.3 < f3/(fw \cdot ft)^{(1/2)} < -2.6 \tag{9a}$$

$$-3.1 < f3/M3 < -1.7 \tag{10a}$$

$$1.18 < \beta 3t/\beta 3w < 1.50 \tag{11a}$$

In the present invention as described above, it is possible to obtain a bright and wide zoom lens while the whole lens system is compact and the optical performance is high over the entire zoom range.

In each embodiment, the moving loci for zooming of the second lens unit L2 and third lens unit L3 are preferably loci which monotonically change in the same direction from the image side to the object side when performing zooming from the wide angle end to the telephoto end. In this arrangement, the moving locus range can easily be shared, so the whole system is readily downsized while suppressing the increase in total lens length.

In each embodiment, suitable materials are determined in order to satisfactorily correct various aberrations such as coma and spherical aberration while suppressing the occurrence of chromatic aberration in the second lens unit. Consequently, chromatic aberration including that of the cemented lens is effectively corrected. In addition, spherical aberration that readily occurs when the aperture is increased (Fno is decreased) is satisfactorily corrected by giving an aspherical shape to the lens surface of at least one of the positive lenses.

The second lens unit L2 preferably includes a positive lens having a surface convex to the object side, a cemented lens obtained by cementing a positive lens and negative lens, and a positive biconvex lens in this order from the object side to the image side. In addition, at least one of the lens surfaces of the positive lenses in the second lens unit L2 preferably has an aspherical shape. The first lens unit L1 preferably includes a negative lens having a surface concave to the image side, a negative lens having a surface concave to the object side, and a positive lens having a surface convex to the object side in this order from the object side to the image side.

The aperture stop is disposed on the object side of the second lens unit L2, and moved together with the second lens unit L2 during zooming. It is also possible to independently move the aperture stop SP during zooming. This increases the degree of freedom for cutting flare light rays. The first lens unit L1 includes a negative lens, made of a plastic material, having a focal length fn. The second lens unit L2 includes a positive lens, made of a plastic material, having a focal length fp.

In this case, the following conditional expression is met:

$$0.85 < |fp/fn| < 1.15 \quad (12)$$

More preferably, the following conditional expression is met:

$$0.95 < |fp/fn| < 1.05 \quad (12a)$$

According to this inequality, it is readily possible to reduce a focusing variation even when the refractive index of plastic changes due to a temperature change. The lens configuration of each embodiment will be explained below.

First Embodiment

The first lens unit L1 includes a negative meniscus lens G11 having a surface convex to the object side, a negative meniscus lens G12 having a surface convex to the image side, and a positive meniscus lens G13 having a surface convex to the object side. The chromatic aberration of the positive lens G13 is satisfactorily corrected by using a highly dispersed material.

The second lens unit L2 includes a positive biconvex lens G21, a positive biconvex lens G22, a negative biconcave lens G23, and a positive biconvex lens G24. The positive lens G22 and negative lens G23 form a cemented lens obtained by cementation, and chromatic aberration is satisfactorily corrected by increasing the difference between the Abbe constants of the materials of the two lenses. The two surfaces of the positive lens G21 are aspherical surfaces.

Aspherical surfaces are appropriately arranged in the second lens unit L2 in which an axial ray that determines the Fno (f-number) spreads, thereby satisfactorily correcting spherical aberration that readily occurs when the aperture diameter is increased. Also, chromatic aberration is satisfactorily corrected by using a low dispersion material (having an Abbe constant exceeding 70) as the material of the positive lens of the second lens unit. The third lens unit L3 includes a negative meniscus lens G31 having a surface convex to the image side.

Since the two surfaces of the negative lens G31 are aspherical surfaces, offaxial aberration such as astigmatism is satisfactorily corrected.

Second Embodiment

The first lens unit L1 includes a negative meniscus lens G11 having a surface convex to the object side, a negative biconcave lens G12, and a positive meniscus lens G13 having a surface convex to the object side. The second lens unit L2 includes a positive meniscus lens G21 having a surface convex to the object side, a positive biconvex lens G22, a negative biconcave lens G23, and a positive biconvex lens G24. The positive lenses G22 and G23 form a cemented lens obtained by cementation. The two surfaces of the positive lens G24 are aspherical surfaces. The third lens unit L3 includes a negative biconcave lens G31. The two surfaces of the negative lens G31 are aspherical surfaces.

Third Embodiment

The first lens unit L1 includes a negative meniscus lens G11 having a surface convex to the object side, a negative biconcave lens G12, and a positive meniscus lens G13 having a surface convex to the object side. The second lens unit L2 includes a positive meniscus lens G21 having a surface convex to the object side, a positive biconvex lens G22, a negative biconcave lens G23, and a positive biconvex lens G24. The positive lenses G22 and G23 form a cemented lens obtained by cementation. The two surfaces of the positive lens G24 are aspherical surfaces. The third lens unit L3 includes a negative meniscus lens G31 having a surface convex to the image side.

Fourth Embodiment

The first lens unit L1 includes a negative meniscus lens G11 having a surface convex to the object side, a negative biconcave lens G12, and a positive meniscus lens G13 having a surface convex to the object side. The second lens unit L2 includes a positive meniscus lens G21 having a surface convex to the object side, a positive biconvex lens G22, a negative meniscus lens G23 having a surface concave to the object side, and a positive biconvex lens G24. The positive lenses G22 and G23 form a cemented lens obtained by cementation. The two surfaces of the positive lens G24 are aspherical surfaces.

The third lens unit L3 includes a negative meniscus lens G31 having a surface convex to the image side. Note that the negative lens G12 and positive lens G24 are aspherical lenses made of plastics, and lighter in weight than a lens made of glass. Plastic material readily changes the refractive index due to a temperature fluctuation in comparison to glass. Therefore, it is favorable to correct the movement of a focal point due to a temperature change by combining positive and negative lenses having different refractive powers. A lens system in which the influence of the movement of a focal point caused by a temperature fluctuation is small is obtained by, for example, meeting conditional expression (12) described previously.

FIG. 9 is a lens sectional view when the zoom lens of the present invention is applied to a monitoring camera with a dome cover. Referring to FIG. 9, the monitoring camera includes a dome cover 11, a zoom lens 13, an image sensor 14, and an optical axis 12. The dome cover 11 has a concentric shape and is mainly made of plastics. The dome cover 11 has an optical influence on the zoom lens 13 to no small extent. Therefore, when applying the zoom lens 13 to an image pickup apparatus including a dome cover as a precondition, it is desirable to correct various aberrations by taking account of the influences (the focal length and material) of the dome cover 11.

FIG. 10 is a schematic view showing major components of a monitoring camera (image pickup apparatus) using the zoom lens of the present invention as an image pickup optical system. Referring to FIG. 10, the monitoring camera includes a main body 30, and an image pickup optical system 31 formed by any of the zoom lenses explained in the embodiments.

A solid-state image sensor 32 such as a CCD sensor or CMOS sensor is incorporated into the main body of the monitoring camera, and receives an object image formed by the image pickup optical system 31. A memory 33 records information corresponding to the object image photoelectrically converted by the solid-state image sensor 32. A network cable 34 transfers the object image photoelectrically converted by the solid-state image sensor 32. The image pickup apparatus is not limited to the monitoring camera, and the present invention is similarly usable in, e.g., a video camera or digital camera.

According to each embodiment as described above, it is possible to obtain a zoom lens which is compact and has a high zoom ratio and yet has a wide angle of field and a small Fno (f-number), and obtain an image pickup apparatus including the zoom lens.

Note that each embodiment may also take the following arrangements.

Appropriately change the shapes of lenses and the numbers of lenses indicated in each embodiment.

Move a given lens or lens unit so as to have a component perpendicular to the optical axis, thereby correcting an image blur caused by a vibration such as a shake.

Correct distortion, chromatic aberration, and the like by using an electrical correcting means when each embodiment is used in an image pickup apparatus.

The preferred embodiments of the present invention have been explained above, but the present invention is not limited to these embodiments and the optical specifications (the angle of field and Fno), and can variously be modified without departing from the scope and spirit of the invention.

Next, numerical value examples of the present invention will be presented below. In each numerical value example, i indicates the ordinal number of a surface from the object side, and ri indicates the radius of curvature of a lens surface. di indicates a lens thickness and air space between the ith surface and (i+1)th surface. ndi and vdi respectively indicate a refractive index and Abbe constant with respect to the d-line. * indicates an aspherical surface. Also, two surfaces closest to the image side are glass materials such as face plates. Furthermore, k, A4, A6, A8, A10, and A12 are aspherical surface coefficients.

When a displacement in the optical axis direction in a position at a height h from the optical axis is x based on a surface vertex, an aspherical shape is represented by:

$$x = (h^2/R)/[1+\{1-(1+k)(h/R)2\}^{1/2}] + A4 \cdot h4 + A6 \cdot h6 + A8 \cdot h8 + A10 \cdot h10 + A12 \cdot h12$$

where R is a paraxial radius of curvature. Note that back focus BF is indicated by a distance from a surface (glass surface) closest to the image side. Table 1 shows the relationship between the above-described conditional expressions and numerical value examples.

Numerical Example 1

| Surface number | R | d | nd | vd |
|---|---|---|---|---|
| 1 | 35.663 | 0.5 | 1.88300 | 40.8 |
| 2 | 4.200 | 1.77 | | |
| 3 | −8.623 | 0.45 | 1.69680 | 55.5 |
| 4 | −183.513 | 0.15 | | |
| 5 | 14.203 | 0.83 | 1.95906 | 17.5 |
| 6 | 369.341 | (variable) | | |
| 7 (stop) | ∞ | 0.15 | | |
| 8* | 4.802 | 2.51 | 1.55332 | 71.7 |
| 9* | −10.615 | 0.15 | | |
| 10 | 6.103 | 2.07 | 1.49700 | 81.5 |
| 11 | −7.106 | 0.3 | 1.91082 | 35.3 |
| 12 | 4.069 | 0.66 | | |
| 13 | 6.294 | 2.05 | 1.65160 | 58.5 |
| 14 | −5.457 | (variable) | | |
| 15* | −3.451 | 0.5 | 1.52996 | 55.8 |
| 16* | −5.891 | (variable) | | |
| 17 | ∞ | 0.6 | 1.51633 | 64.1 |
| 18 | ∞ | | | |

Aspheric data

8th surface

K = 9.05896e−002    A4 = −9.47018e−004    A6 = −2.13084e−005
A8 = 6.56452e−007

9th surface

K = 0.00000e+000    A4 = 1.12356e−003    A6 = −1.12572e−005
A8 = 2.34346e−006

15th surface

K = −9.49945e−001    A4 = 1.49791e−003

16th surface

K = 0.00000e+000    A4 = 2.96725e−003    A6 = −4.44964e−006

Various data
Zoom ratio 4.9

| | Wide angle | Intermediate | Telephoto |
|---|---|---|---|
| Focal length | 2.22 | 5.26 | 10.84 |
| F-number | 1.54 | 2.24 | 3.50 |
| Half view angle (°) | 43.1 | 17.2 | 8.3 |
| Image height | 1.58 | 1.58 | 1.58 |
| Lens total length | 28.71 | 23.62 | 26.42 |
| BF | 0.96 | 0.96 | 0.96 |

Interval

| | | | |
|---|---|---|---|
| d6 | 12.61 | 3.84 | 0.39 |
| d14 | 1.5 | 1.67 | 2.4 |
| d16 | 0.95 | 4.45 | 9.97 |

Focal lengths of units

| Unit 1 | −5.2 |
|---|---|
| Unit 2 | 6.24 |
| Unit 3 | −16.93 |

Numerical Example 2

| Surface number | r | d | nd | vd |
|---|---|---|---|---|
| 1 | 11.105 | 0.45 | 1.88300 | 40.8 |
| 2 | 4.324 | 2.66 | | |
| 3 | −10.868 | 0.45 | 1.71300 | 53.9 |
| 4 | 21.452 | 0.15 | | |

-continued

| | | | | |
|---|---|---|---|---|
| 5 | 13.18 | 0.91 | 1.95906 | 17.5 |
| 6 | 74.58 | (variable) | | |
| 7 (stop) | ∞ | 0.15 | | |
| 8 | 6.441 | 1.88 | 1.65100 | 56.2 |
| 9 | 39.955 | 0.15 | | |
| 10 | 5.474 | 2.7 | 1.49700 | 81.5 |
| 11 | −8.868 | 0.4 | 1.90366 | 31.3 |
| 12 | 6.816 | 0.79 | | |
| 13* | 4.000 | 2.5 | 1.58313 | 59.4 |
| 14* | −8.842 | (variable) | | |
| 15* | −11.359 | 0.5 | 1.53110 | 56.0 |
| 16* | 27.326 | (variable) | | |
| 17 | ∞ | 0.6 | 1.51633 | 64.1 |
| 18 | ∞ | | | |

Aspheric data

13th surface

K = 0.00000e+000    A4 = −2.62171e−003    A6 = −1.11145e−004
A8 = −4.67554e−006  A10 = 2.19677e−007

14th surface

K = 0.00000e+000    A4 = 1.16177e−003    A6 = −1.88087e−004
A8 = 1.35738e−005

15th surface

K = 1.84011e+001    A4 = −9.11143e−003   A6 = 1.36723e−003
A8 = −7.12965e−006

16th surface

K = 0.00000e+000    A4 = −8.15666e−003   A6 = 1.78403e−003
A8 = −1.01650e−004  A10 = −3.23662e−006

Various data
Zoom ratio 4.5

| | Wide angle | Intermediate | Telephoto |
|---|---|---|---|
| Focal length | 2.22 | 4.99 | 9.99 |
| F-number | 1.43 | 1.92 | 2.8 |
| Half view angle (°) | 41.6 | 18.0 | 9.0 |
| Image height | 1.58 | 1.58 | 1.58 |
| Lens total length | 31.72 | 25.1 | 26.16 |
| BF | 0.49 | 0.49 | 0.49 |
| Interval | | | |
| d6 | 14 | 4.4 | 0.4 |
| d14 | 1.5 | 1.58 | 2.06 |
| d16 | 1.43 | 4.33 | 8.92 |

Focal lengths of units

| Unit 1 | −5.93 |
|---|---|
| Unit 2 | 6.38 |
| Unit 3 | −15.04 |

Numerical Example 3

| Surface number | r | d | nd | vd |
|---|---|---|---|---|
| 1 | 9.957 | 0.45 | 1.88300 | 40.8 |
| 2 | 4.038 | 2.63 | | |
| 3 | −9.237 | 0.45 | 1.67790 | 50.7 |
| 4 | 27.184 | 0.15 | | |
| 5 | 10.952 | 0.93 | 1.95906 | 17.5 |
| 6 | 39.88 | (variable) | | |
| 7 (stop) | ∞ | 0.15 | | |
| 8 | 6.826 | 1.68 | 1.59522 | 67.7 |
| 9 | 32.839 | 0.15 | | |
| 10 | 5.165 | 2.62 | 1.49700 | 81.5 |
| 11 | −8.958 | 0.4 | 1.90366 | 31.3 |
| 12 | 13.917 | 0.72 | | |
| 13* | 6.015 | 2.6 | 1.53110 | 56.0 |
| 14* | −6.094 | (variable) | | |
| 15 | −7.324 | 0.5 | 1.69895 | 30.1 |
| 16 | −36.247 | (variable) | | |
| 17 | ∞ | 0.6 | 1.51633 | 64.1 |
| 18 | ∞ | | | |

Aspheric data

13th surface

K = 0.00000e+000    A4 = −3.15720e−003   A6 = −8.90259e−005
A8 = 1.50592e−006   A10 = 4.75512e−007

14th surface

K = 0.00000e+000    A4 = 1.11284e−003    A6 = −9.90132e−005
A8 = 1.07057e−005   A10 = 4.75512e−007

Various data
Zoom ratio 4.0

| | Wide angle | Intermediate | Telephoto |
|---|---|---|---|
| Focal length | 2.25 | 4.78 | 9.08 |
| F-number | 1.46 | 1.94 | 2.8 |
| Half view angle (°) | 41.3 | 18.9 | 9.9 |
| Image height | 1.58 | 1.58 | 1.58 |
| Lens total length | 30.71 | 24.57 | 25.39 |
| BF | 1.4 | 1.4 | 1.4 |
| Interval | | | |
| d6 | 13.17 | 4.37 | 0.66 |
| d14 | 1.6 | 1.6 | 1.6 |
| d16 | 0.51 | 3.17 | 7.7 |

Focal lengths of units

| Unit 1 | −5.96 |
|---|---|
| Unit 2 | 6.13 |
| Unit 3 | −13.23 |

Numerical Example 4

| Surface number | r | d | nd | vd |
|---|---|---|---|---|
| 1 | 9.289 | 0.45 | 1.88300 | 40.8 |
| 2 | 3.95 | 2.21 | | |
| 3* | −7.165 | 0.45 | 1.53110 | 56.0 |
| 4* | 11.346 | 0.26 | | |
| 5 | 9.211 | 0.85 | 1.95906 | 17.5 |
| 6 | 18.289 | (variable) | | |
| 7 (stop) | ∞ | 0.15 | | |
| 8 | 7.433 | 1.76 | 1.59522 | 67.7 |
| 9 | 359.638 | 0.15 | | |
| 10 | 6.586 | 2.45 | 1.49700 | 81.5 |
| 11 | −7.122 | 0.4 | 1.90366 | 31.3 |
| 12 | −97.504 | 0.7 | | |
| 13* | 11.695 | 2.8 | 1.53110 | 56.0 |
| 14* | −6.363 | (variable) | | |
| 15 | −5.276 | 0.45 | 1.95906 | 17.5 |
| 16 | −7.975 | (variable) | | |
| 17 | ∞ | 0.6 | 1.51633 | 64.1 |
| 18 | ∞ | | | |

Aspheric data

3rd data

K = 0.00000e+000    A4 = 2.74059e−004    A6 = 2.03167e−004
A8 = −2.27527e−005  A10 = 4.65790e−007

-continued

4th data

| | | |
|---|---|---|
| K = 0.00000e+000 | A4 = 6.61895e-004 | A6 = 9.17956e-005 |
| A8 = -3.75886e-006 | A10 = -5.44049e-007 | A12 = -4.29687e-011 |

13th data

| | | |
|---|---|---|
| K = 0.00000e+000 | A4 = -2.06305e-003 | A6 = -6.10543e-005 |
| A8 = 4.66794e-006 | A10 = -4.84672e-008 | |

14th data

| | | |
|---|---|---|
| K = 0.00000e+000 | A4 = 3.20813e-004 | A6 = -2.69563e-005 |
| A8 = 3.10471e-006 | | |

Various data
Zoom ratio 3.7

| | Wide angle | Intermediate | Telephoto |
|---|---|---|---|
| Focal length | 2.24 | 4.27 | 8.33 |
| F-number | 1.44 | 1.89 | 2.68 |
| Half view angle (°) | 41.6 | 21.2 | 10.8 |
| Image height | 1.58 | 1.58 | 1.58 |
| Lens total length | 28.73 | 24.77 | 25.21 |
| BF | 0.64 | 0.64 | 0.64 |
| Interval | | | |
| d6 | 10.95 | 4.46 | 0.6 |
| d14 | 1.85 | 2.17 | 4.02 |
| d16 | 1.61 | 3.82 | 6.27 |

Focal lengths of units

| | |
|---|---|
| Unit 1 | -4.79 |
| Unit 2 | 6.05 |
| Unit 3 | -17.69 |

TABLE 1

| | Conditional Expression | Embodiment 1 | Embodiment 2 | Embodiment 3 | Embodiment 4 |
|---|---|---|---|---|---|
| (1) | $\beta 2t/\beta 2w$ | 3.37 | 3.04 | 3.16 | 2.78 |
| (2) | $(\beta 3t/\beta 3w)/(\beta 2t/\beta 2w)$ | 0.43 | 0.40 | 0.45 | 0.52 |
| (3) | $f1/f2$ | -0.83 | -0.79 | -0.93 | -0.97 |
| (4) | $f2/f3$ | -0.37 | -0.34 | -0.42 | -0.46 |
| (5) | $vd1n/vd1p$ | 2.76 | 2.71 | 2.62 | 2.77 |
| (6) | $f1/fw$ | -2.31 | -2.14 | -2.67 | -2.65 |
| (7) | $f2/ft$ | 0.57 | 0.73 | 0.64 | 0.68 |
| (8) | $vd2p/vd2n$ | 2.31 | 2.60 | 2.60 | 2.60 |
| (9) | $f3/(fw \cdot ft)^{(1/2)}$ | -3.41 | -4.10 | -3.19 | -2.93 |
| (10) | $f3/M3$ | -1.88 | -2.36 | -2.09 | -2.84 |
| (11) | $\beta 3t/\beta 3w$ | 1.45 | 1.22 | 1.43 | 1.45 |
| (12) | $|fp/fn|$ | — | — | — | 1.0 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-077500, filed Apr. 3, 2013, which is hereby incorporated by reference herein in its entirety.

What is claimed is:

1. A zoom lens comprising a first lens unit having a negative refractive power, a second lens unit having a positive refractive power, and a third lens unit having a negative refractive power in an order from an object side to an image side, the first, second and third lens units moving during zooming such that a spacing between adjacent lens units changes, the second lens unit and the third lens unit being positioned on the object side at a telephoto end in comparison to at a wide angle end, and the third lens unit moving during focusing, wherein conditional expressions below are met, $$2.5 < \beta 2t/\beta 2w < 4.5$$

$$0.35 < (\beta 3t/(\beta 3w)/(\beta 2t/\beta 2w) < 0.80$$

$$-1.0 < f1/f2 < -0.5$$

where $\beta 2w$ represents a lateral magnification of the second lens unit at the wide angle end, $\beta 2t$ represents a lateral magnification of the second lens unit at the telephoto end, $\beta 3w$ represents a lateral magnification of the third lens unit at the wide angle end, $\beta 3t$ represents a lateral magnification of the third lens unit at the telephoto end, f1 represents a focal length of the first lens unit, and f2 represents a focal length of the second lens unit.

2. A zoom lens according to claim 1, wherein a conditional expression below is met, $$-0.65 < f2/f3 < -0.25$$

where f3 represents a focal length of the third lens unit.

3. A zoom lens according to claim 1, wherein the first lens unit includes at least two negative lenses and at least one positive lens, and a conditional expression below is met, $$2.3 < vd1n/vd1p < 3.5$$

where vd1n represents an average Abbe constant of materials of the negative lenses included in the first lens unit, and vd1p represents an average Abbe constant of materials of the positive lenses included in the first lens unit.

4. A zoom lens according to claim 1, wherein a conditional expression below is met, $$-3.3 < f1/fw < -1.9$$

where fw represents a focal length of a whole system at the wide angle end.

5. A zoom lens according to claim 1, wherein a conditional expression below is met, $$0.52 < f2/ft < 0.80$$

where ft represents a focal length of a whole system at the telephoto end.

6. A zoom lens according to claim 1, wherein
the second lens unit includes a cemented lens obtained by cementing a positive lens and a negative lens, and
a conditional expression below is met, $$2.1 < vd2p/vd2n < 3.0$$

where vd2p represents an Abbe constant of a material of the positive lens of the cemented lens, and vd2n represents an Abbe constant of a material of the negative lens of the cemented lens.

7. A zoom lens according to claim 1, wherein the second lens unit includes a positive lens having a surface convex to the object side, a cemented lens obtained by cementing a positive lens and a negative lens, and a positive biconvex lens in an order from the object side to the image side, and at least one of lens surfaces of the positive lenses included in the second lens unit is an aspherical surface.

8. A zoom lens according to claim 1, wherein a conditional expression below is met, $$-4.5 < f3/(fw \cdot ft)^{(1/2)} < -2.5$$

where f3 represents a focal length of the third lens unit, fw represents a focal length of a whole system at the wide angle end, and ft represents a focal length of the whole system at the telephoto end.

9. A zoom lens according to claim 1, wherein the third lens unit is composed of one negative lens, and conditional expressions below are met, $$-3.3 < f3/M3 < -1.5$$

$$1.15 < \beta 3t/\beta 3w < 1.60$$

where f3 represents a focal length of the third lens unit, and M3 represents a moving amount of the third lens unit when zooming from the wide angle end to the telephoto end.

10. A zoom lens according to claim 1, wherein the first lens unit includes a negative lens having a surface concave to the image side, a negative lens having a surface concave to the object side, and a positive lens having a surface convex to the object side in an order from the object side to the image side.

11. A zoom lens according to claim 1, wherein the first lens unit includes a negative lens made of a plastic material, the second lens unit includes a positive lens made of a plastic material, and a conditional expression below is met, $$0.85 < |fp/fn| < 1.15$$

where fn represents a focal length of the negative lens of the first lens unit, and fp represents a focal length of the positive lens of the second lens unit.

12. An image pickup apparatus comprising a zoom lens, and a solid-state image sensor configured to receive an image formed by the zoom lens,
wherein the zoom lens comprises a first lens unit having a negative refractive power, a second lens unit having a positive refractive power, and a third lens unit having a negative refractive power in an order from an object side to an image side, the first, second and third lens units moving during zooming such that a spacing between adjacent lens units changes, the second lens unit and the third lens unit being positioned on the object side at a telephoto end in comparison to at a wide angle end, and the third lens unit moving during focusing, wherein conditional expressions below are met, $$2.5 < \beta 2t/\beta 2w < 4.5$$

$$0.35 < (\beta 3t/\beta 3w)/(\beta 2t/\beta 2w) < 0.80$$

$$-1.0 < f1/f2 < -0.5$$

where β2w represents a lateral magnification of the second lens unit at the wide angle end, β2t represents a lateral magnification of the second lens unit at the telephoto end, β3w represents a lateral magnification of the third lens unit at the wide angle end, β3t represents a lateral magnification of the third lens unit at the telephoto end, f1 represents a focal length of the first lens unit, and f2 represents a focal length of the second lens unit.

* * * * *